Figure 1:
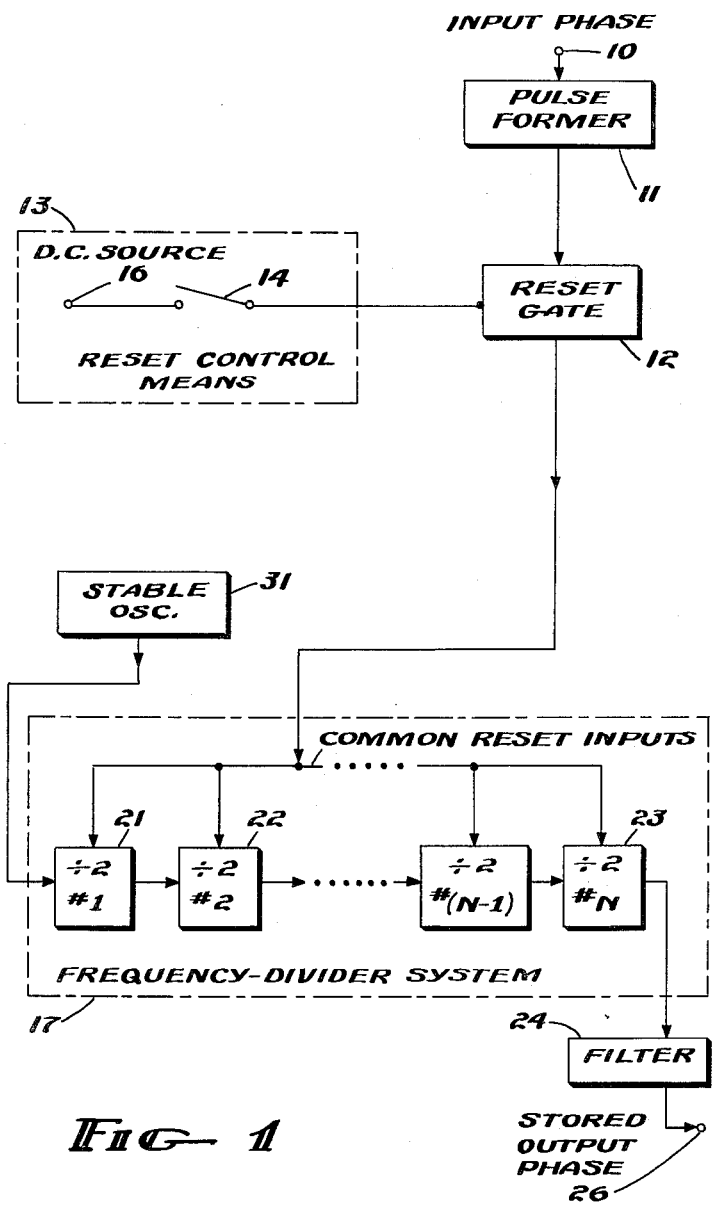

April 3, 1962  F. SECRETAN  3,028,551
DIGITAL PHASE STORAGE CIRCUIT

Filed May 5, 1958  3 Sheets-Sheet 2

INVENTOR.
FRANK SECRETAN
BY Moody and Goldman
ATTORNEYS

INVENTOR.
FRANK SECRETAN

United States Patent Office 3,028,551
Patented Apr. 3, 1962

3,028,551
DIGITAL PHASE STORAGE CIRCUIT
Frank Secretan, West Los Angeles, Calif., assignor to Collins Radio Company, Cedar Rapids, Iowa, a corporation of Iowa
Filed May 5, 1958, Ser. No. 732,900
9 Claims. (Cl. 328—22)

This invention relates to means for storing or remembering the instantaneous phase of a received wave.

It is important in heterogeneous types of newly devised systems to be able to sample the phase existing at a given instant of time of a wave of known frequency and to be able to store that phase for future reference. The storage time can range from a small fraction of a second to many seconds.

An example of a use for a phase-storage device is in propagation studies, wherein a wave of known frequency has its phase varied by propagation conditions. A phase-storage device can sample the phase of the wave and store it for a period sufficiently long to accurately measure the phase of each sampling. Thus, data on propagation phase variations can be obtained.

Another example of use for a phase-storage device is in phase-pulse communication equipment, such as Kineplex (trademark of the Collins Radio Company). In such equipment, the phase-pulse demodulation requires a comparison between the present phase and a prior phase of the same tone. Before the comparison can be made, means must be provided to remember (store) the prior phase; and this is done by a phase-storage device.

A prior type of phase-storage device is a very high-Q keyed resonator, that operates as a ringing circuit, such as found in Patent No. 2,825,808 issued March 4, 1958, titled "Keyed Filter" by Melvin L. Doelz and Earl T. Heald and assigned to the Collins Radio Company. Such resonator can be made to remember the phase of a wave that has the same frequency as the center frequency of the filter. In such case, the received wave is made to vibrate (or ring) the resonator. The resonator can continue to ring with the phase of the received wave after it is no longer being received. This after-ringing at the received phase represents storage of that phase. The resonator stores the phase in sine-wave form since the ringing wave has that form.

However, such high-Q resonator operates upon integration principles and can only provide an output phase which is the average phase of the input wave over the time that it was applied to the resonator. Accordingly, a resonator can remember only average phase, which is advantageous in some situations, but not in others.

On the other hand, the invention is capable of storing the instantaneous phase of a wave. The invention measures and stores phase by pulse or digital techniques; that is, by using the time-position of a sequence of pulses having a fixed repetition rate. For example, the phase of a sine-wave of given frequency can be represented by pulses having the timing of positive-going crossings of its alternating-current axis, called zero-crossings.

Accordingly, the invention converts the incoming wave, which is to be phase-sampled, into pulse-form by means of a pulse-former that generates a time-positioned pulse for each cycle of input. Further, the invention utilizes a stable free-running oscillator as the means of sustaining its phase memory. The amount of oscillator stability determines how long a given phase can be stored at a given accuracy. The oscillator output is provided to a frequency-divider system, having a plurality of binary dividers connected in tandem. The divider output is a pulse-sequence having a repetition rate equal to the incoming frequency.

Each of the binary dividers has a reset input; and their reset inputs are connected in common. A normally-disabled reset gate is connected between the incoming-pulse sequence and the reset inputs of the dividers. Phase sampling is obtained by enabling the reset gate to pass at least one pulse from the incoming pulse source to the common reset inputs of the dividers. Thereafter, the phase of the divider system output represents the phase of the incoming wave at the time it was sampled to an order of accuracy determinable by the invention.

While any type of frequency-divider system can be used, it has been found generally expedient to use pulse dividers of the so called flip-flop type.

It is therefore an object of this invention to provide phase storage means capable of being instantaneously reset to a phase to be remembered.

It is another object of this invention to provide a phase storage circuit which operates digitally.

It is still another object of this invention to provide a phase storage circuit which can provide phase storage at high accuracy over a long period of time.

Figure 3:
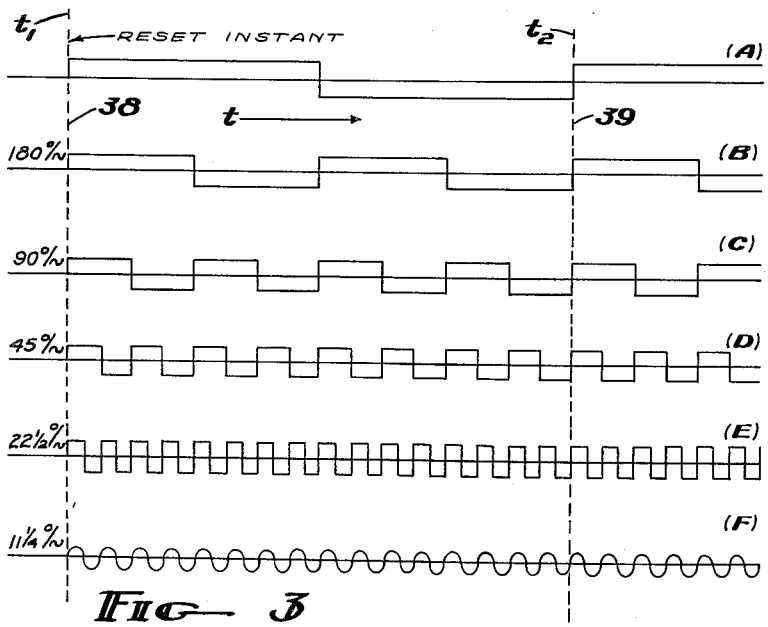
Figure 4:
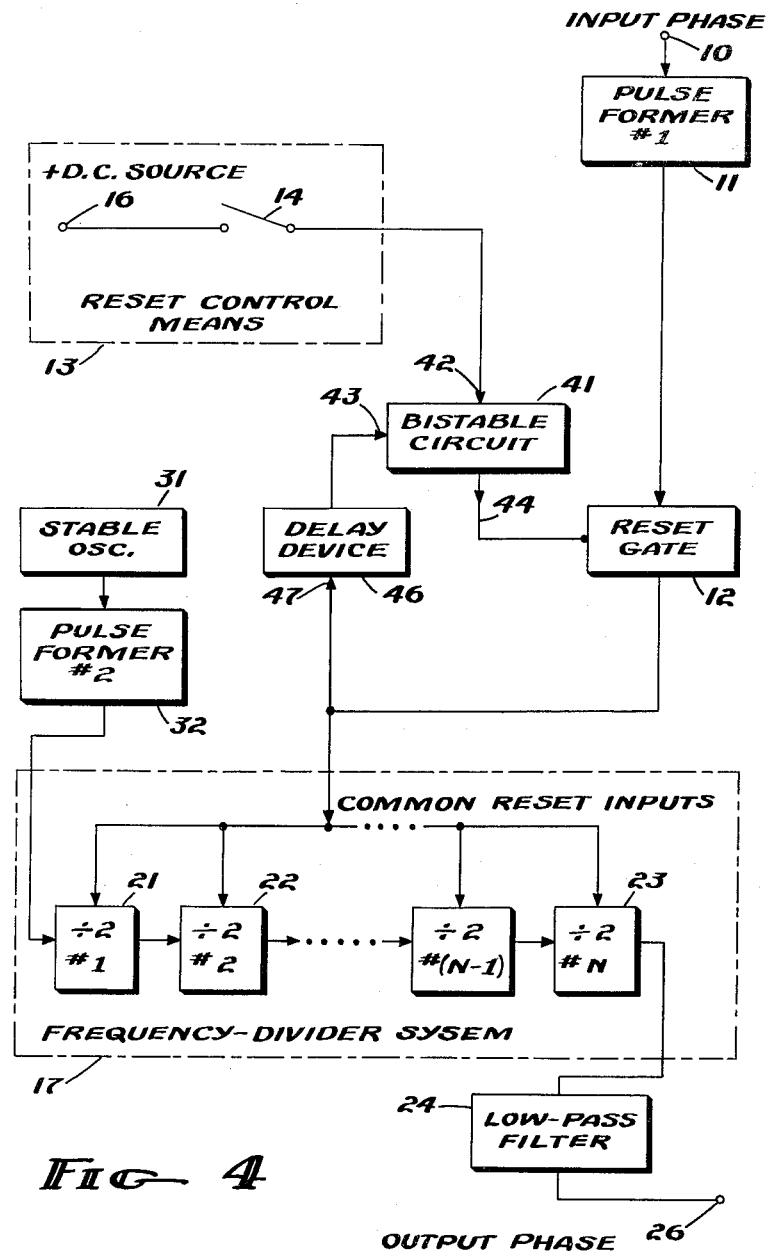

Further objects, features and advantages of this invention will be obvious to a person skilled in the art upon further study of the specification and accompanying drawings, in which:

FIGURE 1 represents a form of the invention;

FIGURES 2(A) through (F) and 3(A) through (F) illustrate waveforms used in explaining the operation of the invention; and FIGURE 4 provides another form of the invention.

Now referring to drawings for a more detailed explanation of the invention, FIGURE 1 is first considered. It has a terminal 10 for receiving a wave that is to have its phase remembered (stored). It will be assumed for purposes of discussion herein that the wave provided at terminal 10 is a sine wave; however, it need not be, and can in fact have any nonsinusoidal shape and can have variations of phase.

A pulse-former 11 is connected to terminal 10 and generates one pulse-per-received-cycle at its positive-going zero crossings. The generated pulses therefore have a fixed phase relationship with respect to the incoming wave. Such pulses are hereafter designated as "incoming pulses." Hence, pulse-former 11 can be any of many well-known circuits such as the multiar, blocking oscillator, one-shot multivibrator, etc.

A reset gate 12 receives the incoming pulses from pulse-former 11. A reset-control means 13 has its output connected to an enabling input of gate 12. Reset-control means 13 can take many forms, and will generally be an electronic switch, such as a multivibrator or flip-flop circuit. However, to basically illustrate its principle in the invention, it is shown as a single-throw single-pole normally-open switch 14 that is serially connected to an enabling direct-current source at a terminal 16. Hence, reset gate 12 passes the pulses received from circuit 11 only when switch 14 is enabled. Generally, switch 14 will be enabled only momentarily so that gate 12 can pass one or a few pulses. The output of the invention will have the phase represented by the timing of the last pulse passing through reset gate 12 before switch 14 is disabled.

A frequency-divider system 17 receives the output from reset gate 12. System 17 is comprised of N number of binary dividers connected in tandem. The individual dividers 21, 22, etc. can be flip-flop circuits. Such binary pulse-dividers are so well known in the art that they are not explained in detail herein. However, each of the dividers has a reset input, which is shown as a separate input to each divider. However, it also can be the same input which normally receives pulses that are to be repetition-rate divided.

The first binary divider 21 receives the output from a a stable oscillator 31, that is preferably a crystal oscillator for moderate stability.

The switching of first divider 21 is timed with a certain portion of each oscillator cycle. For example, if divider 21 is a flip-flop, it is triggered every time the oscillator output provides a positive-going axis crossing. Similarly, each of the other dividers is triggered by the first positive-going part of each cycle received from its preceding divider. Hence, the output of the last divider has a discrete phase relationship with respect to oscillator 31.

The output of the system is provided from the last binary divider 23 through a filter 24 to an output terminal 26. Filter 24 removes the harmonic control of the pulsed output wave and reduces it to a sine-wave form having an output frequency ($f_{out}$) equal to the frequency ($f_{in}$) of the wave provided at input terminal 10. Since there are N number of binary dividers in system 17, the frequency ($f_{osc}$) of oscillator 31 is determined by the expression:

$$f_{osc} = 2^N f_{in} \qquad (1)$$

Figure 2:
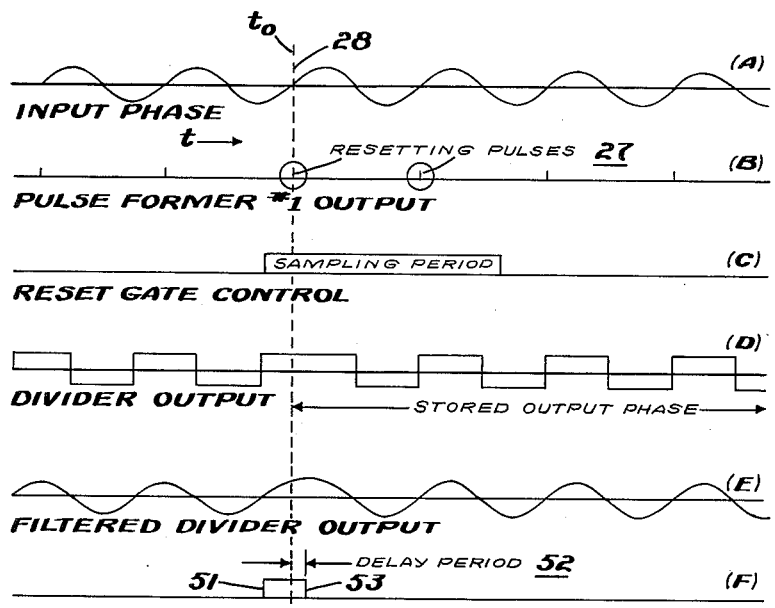

The operation of the system of FIGURE 1 is next given using FIGURES 2(A) through (F). FIGURE 2(A) illustrates an input wave provided at terminal 10. FIGURE 2(B) illustrates the corresponding pulses provided from pulse-former 11; wherein a positive output pulse is provided at each positive-going crossing of the alternating-current axis in FIGURE 2(A). Control switch 14 is then closed for the interval represented by the sampling period in FIGURE 2(C). Hence, the encircled pulses 27, in FIGURE 2(B), are permitted to pass through reset gate 12. Pulses 27 are designated "resetting pulses." A time $t_0$ is represented by the dashed-vertical line 28 in FIGURE 2 and represents the timing of the first resetting pulse 27.

Previous to time $t_0$, the divider-system output at terminal 26 has a discrete phase relationship to oscillator 31. This discrete phase relationship can take any one of a number of values depending upon the particular harmonic relationship between the oscillator frequency and the divider output frequency determined by the division ratio. Thus, with a division ratio of $2^N$, the output frequency can have any one of possible $2^N$ different discrete phases with respect to the input wave at terminal 10.

Whenever a resetting voltage is applied to the common reset inputs of the dividers, they are each reset to a predesignated state, such as the higher of their two output levels, which effectively begins a new cycle at output terminal 26, no matter in which portion of an output cycle the dividers may have been before they were reset. Hence, at time $t_0$, the first reset pulse 27 is applied to the common reset inputs of all the binary dividers. Consequently, the first resetting pulse 27 resets all the dividers to start a new cycle of output at terminal 26, regardless of which portion of a cycle the divider output was previously in. Thereafter, the output wave at terminal 26 will have very nearly the same phase as the wave at terminal 10, because the resetting pulse, which indicates the beginning of an input cycle, causes the beginning of an output cycle. Accordingly, the input and output waves must be in phase at the time of reset by pulse 27.

However, there may be a small phase-error between the input and output waves after the reset. This error is caused by the fact that when the reset pulse tells the divider to start a new cycle, it waits until the beginning of the next cycle from oscillator 31 to do so.

Since oscillator 31 provides $2^N$ cycles-per-cycle of $f_{out}$, the maximum waiting time decreases as the number (N) of dividers is made larger. Accordingly, each oscillator cycle represents $$\frac{1}{2^N}$$

an output cycle, which is the maximum reset phase-error of the stored phase at output terminal 26. Accordingly, the maximum reset phase error ($E_m$) is represented by the following expression:

$$E_m = \frac{360}{2^N} \text{ degrees} \qquad (2)$$

Thus, the more binary dividers there are in divider system 17, the more accurately will the system reset to the input phase.

However, the accuracy of the stored phase after a period of time depends also on the stability of oscillator 31. For example, if the storage period is short, oscillator 31 can have low stability, because its phase-drift over a very short period may be slight. On the other hand, if the storage period is long, oscillator 31 should have commensurately greater stability.

No further resetting pulses are needed after the first pulse 27. However, if the next pulse 27 is permitted to pass through the reset gate, which it does in FIGURE 2(C), second pulse 27 has no effect if the phase of the input wave has not changed, because it attempts to reset the dividers to the same positions it finds them.

Thus, in FIGURE 2(D) the square-wave portion to the left of line 28 (before $t_0$) represents the phase of the divider-system output before the first pulse 27. At time $t_0$, the divider system is reset and begins a new output cycle not related to its previous phase. It can be seen by comparing the waves in FIGURES 2(A) and (E) after time $t_0$, that they are in phase.

It is only when the input wave changes phase that later resetting pulses from gate 12 are effective. In such case, the output wave will have the phase of the last resetting pulse passed by gate 12.

In order to explain in detail the internal resetting operation of the divider, reference is made to FIGURE 3, which assumes five dividers in system 17 for explanation purposes. The divider outputs will have the periodic relationships illustrated in FIGURES 3(A)–(F). FIGURE 3(A) represents the output from the last divider, which is connected to terminal 26; and FIGURE 3(F) represents the output from oscillator 31 to the first divider of the system 17. The dividers all begin a cycle at time $t_1$; and the system completes one cycle of output at time $t_2$, at which a new cycle is begun.

It can be seen that for one output cycle in FIGURE 3(A), oscillator 31 provides $2^5$ or 32 cycles, and therefore each represents 11¼ degrees of an output cycle. It is immaterial to oscillator 31 at which of its cycles an output cycle begins. Accordingly, the system output cycle can have any one of $2^N$ (which here is 32) discrete phases, and the maximum reset error by expression 2 above is $11^N$ degrees. However, the uses of eight binary dividers would reduce the phase error to 1.4 degrees and more would reduce it to less than a degree.

An applied reset pulse will cause the output of each divider in system 17 to be at a predesignated level, which in this example is presumed to be the high output level of each divider. Thus, if a reset pulse occurs at time $t_1$ FIGURE 3, the output of each divider is then switched to its high-level state unless it was already there, so that all dividers are then in that state. If no further reset pulses are provided, or if reset pulses are thereafter phase-synchronously provided, the output of the divider system will periodically continue with the same phase as is illustrated in FIGURE 3(A).

The reset pulses must have priority over the normal input pulses received from the oscillator or from prior dividers. This can be realized by noting that it is possible for a reset pulse to occur coincident with the transition of any of the respective divider outputs. Thus, it is necessary to make the reset pulses have a duration slightly longer than the transition time for any of the dividers and larger in amplitude than the normal input pulse received by the respective divider. Consequently, if a reset pulse occurs coincident with a divider's normal input pulse, the larger amplitude reset pulse overpowers the normal input pulse and controls the output state of the divider, thus causing it to have a high output level. On the other hand, if the reset pulse occurs shortly after the divider has begun a transition, due to prior reception of a normal input pulse, the reset pulse cannot have any effect upon the divider until the transition terminates. With the reset pulse being longer than the transition time, the reset pulse takes effect as soon as such transition is over, so that the output state of each divider is switched to the required state.

Although the duration time of the reset pulses should be longer than the transition time of any flip-flop circuit, the reset-pulse duration should be made as short as possible where the phase information is determined by the leading edge of the reset pulse, since additional phase error can be caused by its excessive length. However, if the input phase information is provided by the trailing edge of each reset pulse, it can be made as long as required. Thus, where the transition period is long, it will be necessary to provide long duration resetting pulses; and it is desirable to have the phase information encoded by their trailing edges.

When the instantaneous phase of a wave is required, it is necessary to sample the phase over as short a period of time as possible, which requires sampling by means of a single reset pulse. The system illustrated in FIGURE 4 allows sampling using only a single reset pulse at any one time.

The portions of FIGURE 4 that are common to FIGURE 1 are given the same reference numerals. Additionally, a bistable circuit 41, which may be a flip-flop circuit, is provided with a pair of inputs 42 and 43. Input 42 is connected to the output of control means 13. In this example, a positive pulse at input terminal 42 causes the output 44 of circuit 41 to be at a high level; while a positive pulse at another input 43 causes output 44 to be at a low level. Negative input pulses are without effect. This type of bistable circuit design is well known in the art.

Thus, bistable circuit 41 has its output 44 switched to a high level at the instant switch 14 is closed. Consequently, reset gate 12 is enabled and permits the next pulse from circuit 11 to reset divider system 17.

A delay device 46 has its input 47 connected to the output of gate 12 to also receive the first reset pulse passing through gate 12. Delay device 46 provides an output pulse a fraction of a period at the input frequency after it receives a pulse. Delay device 46 may be any type of delay line or may be a one-shot delay multivibrator. The output pulse from delay device 46 is provided to input 43 of bistable circuit 41 and triggers it back to its low state, thereby disabling reset gate 12 and preventing any further reset pulses from passing through it. Hence, only one reset pulse is used for one closing of switch 14. FIGURE 2(F) illustrates a cycle of operation of reset gate 12 in FIGURE 4. At instant 51, switch 14 is closed, which triggers bistable circuit 41 and enables reset gate 12. As soon as first pulse 27 passes through the reset gate, the pulse is delayed in device 46 for a period 52 shown in FIGURE 2(F); after which, bistable circuit 41 is triggered by the delayed pulse to disable gate 12 at time 53. Hence, reset gate 12 is closed before a second reset pulse can be received from circuit 11, and only a single reset pulse can pass through it.

Although this invention has been described with respect to particular embodiments thereof, it is not to be so limited as changes and modifications may be made which are within the full intended scope of the invention as defined by the appended claims.

I claim:

1. Means for digitally storing the phase of a received wave, provided from a first source at a particular frequency comprising a local source of frequency that is a multiple of the particular frequency of the received wave from said first source, a plurality of bistable circuits connected in tandem to said local source, the output of said bistable circuits having a frequency equal to the frequency of said received wave, a reset gate having a pair of inputs and an output, with its output connected to a reset input of each bistable circuit, means connecting one input of said reset gate to said first source, a reset-control means, and said reset control means being connected to the other input of said reset gate, the controlled output from said gate resetting each of said bistable circuits to a given portion of an operating cycle, and the output of said bistable circuits being resettable by enabling said gate.

2. A phase storage system as defined in claim 1 in which said local source is a stable oscillator, and each of said bistable circuits is a binary divider.

3. A phase storage system as defined in claim 1 in which said reset-control means comprises, a pulsing device, and feedback means connecting the output of said reset gate to said control means to permit the passage of only one output pulse from said gate for one actuation of said reset-control means.

4. A system for storing the phase of a received wave provided from a first source at a particular frequency, comprising a pulse former receiving said wave and generating pulses from its zero crossings, a reset gate having a pair of inputs and a output, one input of said gate receiving a pulsed output of said pulse former, reset-control-switching means, means connecting the other input of said gate to said switching means, a stable oscillator having a frequency that is a multiple of the frequency of said received wave, a chain of bistable devices connected in tandem to said oscillator, a reset input included with each bistable device for enabling reset by it to a given state, each of said reset inputs connected to the output of said gate, and the output of said chain having a frequency equal to that of the received wave.

5. A system as defined in claim 4 having a second pulse former connected between said oscillator and said chain.

6. Means for digitally storing the phase of a received wave, comprising a crystal-controlled oscillator having an output frequency $f_{osc}$, $n$ number of frequency-dividing-bistable circuits connected in tandem to said oscillator, each of said dividing bistable circuits having a reset input, the output frequency of the last dividing bistable circuit being $$\frac{f_{osc}}{2^n}$$

which is equal to the fundamental frequency of said received wave, a normally-disabled reset gate having a pair of inputs and an output, said gate output being connected to the reset input of each of said dividing-bistable circuits, means connecting said received wave to one input of said reset gate, and control means connected to the other input of said gate to enable said gate at phase-sampling instances, with the output of the last dividing-bistable circuit storing the phase of the input wave immediately after the sampling instances.

7. Phase-storage means as defined in claim 6 in which a pulse former is connected between said received wave and said one input of said reset gate, said pulse former generating one pulse per cycle of said received wave timed with its zero-crossings.

8. Phase-storage means as defined in claim 7 in which a low-pass filter is connected to the output of the last dividing bistable circuit to pass its output fundamental frequency as the phase-stored output, and a second pulse former connected between said oscillator and the input to the first dividing bistable circuit to generate one pulse per oscillator cycle.

9. Phase-storage means as defined in claim 8 in which said control means comprises, a switching device for momentarily providing an enabling output at sampling instances, a bistable circuit having a pair of opposite inputs and an output, with one input connected to said switching device and the output connected to the other input of said reset gate, a delay device connected between the output of said reset gate and the other input of said bistable circuit, and said delay device having a delay of less than one period of the received wave.

References Cited in the file of this patent

UNITED STATES PATENTS

| | | |
|---|---|---|
| 2,549,505 | Mohr | Apr. 17, 1951 |
| 2,553,594 | Lichtman et al. | May 22, 1951 |
| 2,736,805 | Hollywood | Feb. 28, 1956 |
| 2,768,290 | Harris | Oct. 23, 1956 |
| 2,828,416 | Ayres et al. | Mar. 25, 1958 |
| 2,885,553 | Albro et al. | May 5, 1959 |

OTHER REFERENCES

Electronics, October 1956, pages 220 to 223, "Phase Generator for Troposperic Research," by R. W. Hubbard et al.

Taub: Pulse and Digital Circuits, McGraw-Hill, 1956, page 116 and pages 412 to 413.